United States Patent
Arends et al.

(10) Patent No.: US 12,513,576 B2
(45) Date of Patent: Dec. 30, 2025

(54) SYSTEM FOR DETERMINING RADIO ACCESS TECHNOLOGY TYPE

(71) Applicant: T-Mobile USA, Inc., Bellevue, WA (US)

(72) Inventors: Joel Arends, Renton, WA (US); Nassereddine Sabeur, Bellevue, WA (US); Saqib Badar, Bellevue, WA (US); A Karl Corona, Maple Valley, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 504 days.

(21) Appl. No.: 18/047,091

(22) Filed: Oct. 17, 2022

(65) Prior Publication Data

US 2024/0129806 A1   Apr. 18, 2024

(51) Int. Cl.
*H04W 36/00* (2009.01)
*H04L 65/1045* (2022.01)

(52) U.S. Cl.
CPC ... *H04W 36/00226* (2023.05); *H04L 65/1045* (2022.05)

(58) Field of Classification Search
CPC ......... H04W 36/00226; H04W 60/005; H04W 76/12; H04W 8/26; H04W 36/0022; H04W 36/14; H04W 76/10; H04W 80/10; H04W 36/13; H04W 24/02; H04W 4/025; H04W 4/90; H04W 76/15; H04W 76/50; H04L 65/1045; H04L 65/1016; H04L 65/1069; H04L 65/1104; H04L 65/1073; H04L 65/1083; H04L 65/1095; H04L 65/1066; H04L 65/65
See application file for complete search history.

(56) References Cited

U.S. PATENT DOCUMENTS

2022/0191747 A1 * 6/2022 Ignjatovic ....... H04W 36/00226
2022/0386183 A1 * 12/2022 Guo ..................... H04L 65/1016

FOREIGN PATENT DOCUMENTS

KR   20120002241 A * 1/2012 ............. H04L 12/14
WO   WO-2017203328 A1 * 11/2017 ......... H04L 65/1016

* cited by examiner

*Primary Examiner* — Diane D Mizrahi
*Assistant Examiner* — Jing Gao
(74) *Attorney, Agent, or Firm* — Lee & Hayes, P.C.

(57) ABSTRACT

A network may include a proxy-call session control function (P-CSCF) of a communication network that is configured to determine, record, and report on call types of calls originating from user equipment associated with the communication network. In some cases, the P-CSCF may determine the call type based on radio access technology types reported by the originating user equipment and/or by a proxy control function associated with the call.

20 Claims, 10 Drawing Sheets

200 ⤺

```
┌─────────────────────────────────────────────────┐
│ RECEIVING, AT AN P-CSCF FROM A UE, A CALL INVITE,│
│         THE CALL INVITE INCLUDING LOCATION DATA │
│                      202                         │
└─────────────────────────────────────────────────┘
                        ↓
┌─────────────────────────────────────────────────┐
│ SENDING, TO A PCF FROM THE P-CSCF, A REQUEST     │
│         INCLUDING THE LOCATION DATA              │
│                      204                         │
└─────────────────────────────────────────────────┘
                        ↓
┌─────────────────────────────────────────────────┐
│ RECEIVING, AT THE P-CSCF FROM AN PCF, A REPLY,   │
│         THE REPLY INCLUDING A FIRST RAT TYPE     │
│                      206                         │
└─────────────────────────────────────────────────┘
                        ↓
┌─────────────────────────────────────────────────┐
│ RECEIVING, AT THE P-CSCF FROM THE PCF, A RESPONSE│
│         INCLUDING A SECOND RAT TYPE              │
│                      208                         │
└─────────────────────────────────────────────────┘
                        ↓
┌─────────────────────────────────────────────────┐
│ DETERMINING THAT A CALL ASSOCIATED WITH THE      │
│         INVITE IS ANSWERED                       │
│                      210                         │
└─────────────────────────────────────────────────┘
                        ↓
┌─────────────────────────────────────────────────┐
│ DETERMINING, A CALL TYPE, BASED AT LEAST IN PART │
│    ON THE FIRST RAT TYPE AND THE SECOND RAT TYPE │
│                      212                         │
└─────────────────────────────────────────────────┘
                        ↓
┌─────────────────────────────────────────────────┐
│ SENDING, BY THE P-CSCF, AN INDICATOR OF THE      │
│         CALL TYPE                                │
│                      214                         │
└─────────────────────────────────────────────────┘
```

RECEIVING, AT AN P-CSCF FROM A UE, A CALL INVITE, THE CALL INVITE INCLUDING LOCATION DATA
302

SENDING, TO A PCF FROM THE P-CSCF, A REQUEST INCLUDING THE LOCATION DATA
304

RECEIVING, AT THE P-CSCF FROM AN PCF, AN AUTHENTICATION, AUTHORIZATION, AND ACCOUNTING (AAA), THE AAA INCLUDING A FIRST RADIO ACCESS TECHNOLOGY (RAT) TYPE
306

RECEIVING, AT THE P-CSCF FROM THE PCF, A RESPONSE INCLUDING A SECOND RAT TYPE
308

DETERMINING THAT THE FIRST RAT TYPE EQUALS THE SECOND RAT TYPE
310

DETERMINING A CALL TYPE IN RESPONSE TO THE FIRST RAT TYPE EQUALING THE SECOND RAT TYPE
312

SENDING, BY THE P-CSCF, AN INDICATOR OF THE CALL TYPE
314

```
┌─────────────────────────────────────────────────────────────┐
│ RECEIVING, AT AN P-CSCF FROM A UE, A CALL INVITE INCLUDING A│
│      FIRST RADIO ACCESS TECHNOLOGY (RAT) TYPE               │
│                          402                                │
└─────────────────────────────────────────────────────────────┘
                              │
                              ▼
┌─────────────────────────────────────────────────────────────┐
│  RECEIVING, AT AN P-CSCF FROM THE UE, AN ACKNOWLEDGMENT     │
│  ASSOCIATED WITH AN ANSWER OF THE CALL, THE ACKNOWLEDGMENT  │
│              INCLUDING A SECOND RAT TYPE                    │
│                          404                                │
└─────────────────────────────────────────────────────────────┘
                              │
                              ▼
┌─────────────────────────────────────────────────────────────┐
│ DETERMINING A CALL TYPE BASED AT LEAST IN PART ON THE FIRST │
│            RAT TYPE AND THE SECOND RAT TYPE                 │
│                          406                                │
└─────────────────────────────────────────────────────────────┘
                              │
                              ▼
┌─────────────────────────────────────────────────────────────┐
│      SENDING, BY THE P-CSCF, AN INDICATOR OF THE CALL TYPE  │
│                          408                                │
└─────────────────────────────────────────────────────────────┘
```

```
┌─────────────────────────────────────────────────────────┐
│ RECEIVING, AT AN P-CSCF FROM A UE, A CALL INVITE        │
│ INCLUDING A FIRST RADIO ACCESS TECHNOLOGY (RAT) TYPE    │
│                          502                            │
└─────────────────────────────────────────────────────────┘
                            │
                            ▼
┌─────────────────────────────────────────────────────────┐
│ RECEIVING, AT AN P-CSCF FROM THE UE, AN ACKNOWLEDGMENT  │
│ ASSOCIATED WITH AN ANSWER OF THE CALL, THE ACKNOWLEDGMENT│
│        INCLUDING A SECOND RAT TYPE                      │
│                          504                            │
└─────────────────────────────────────────────────────────┘
                            │
                            ▼
┌─────────────────────────────────────────────────────────┐
│ DETERMINING THAT THE FIRST RAT TYPE EQUALS THE SECOND   │
│                         RAT TYPE                         │
│                          506                            │
└─────────────────────────────────────────────────────────┘
                            │
                            ▼
┌─────────────────────────────────────────────────────────┐
│ DETERMINE A CALL TYPE IN RESPONSE TO THE FIRST RAT TYPE │
│             EQUALING THE SECOND RAT TYPE                │
│                          508                            │
└─────────────────────────────────────────────────────────┘
                            │
                            ▼
┌─────────────────────────────────────────────────────────┐
│  SENDING, BY THE P-CSCF, AN INDICATOR OF THE CALL TYPE  │
│                          510                            │
└─────────────────────────────────────────────────────────┘
```

FIG. 5

SYSTEM FOR DETERMINING RADIO ACCESS TECHNOLOGY TYPE

BACKGROUND

Today, many networks providers support multiple types of network standards to enhance and increase a serviceable area for their network users. As network technologies have advanced, the number of network standards has continued to increase, as legacy standards remain in effect, and often the network coverage includes overlapping and/or adjacent coverage supported by different standards. The availability of the multiple standards as well as the ability of user equipment to support multiple standards and to switch between standards in substantially real-time based on various factors has led to increased complexity with respect to identifying and debugging issues occurring during calls. Thus, a network architecture capable of identifying standards and types of calls in substantially real-time is desirable.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 is an example flow diagram showing an illustrative process associated with tracking at a proxy call session control function of a network handover type call, in accordance with some examples of the present disclosure.

FIG. 3 is an example flow diagram showing an illustrative process associated with tracking at a proxy call session control function of a network voice over new radio type call, in accordance with some examples of the present disclosure.

FIG. 4 is an example flow diagram showing an illustrative process associated with tracking at a proxy call session control function of a network handover type call, in accordance with some examples of the present disclosure.

FIG. 5 is an example flow diagram showing an illustrative process associated with tracking at a proxy call session control function of a network voice over new radio type call, in accordance with some examples of the present disclosure.

DETAILED DESCRIPTION

Figure 1:
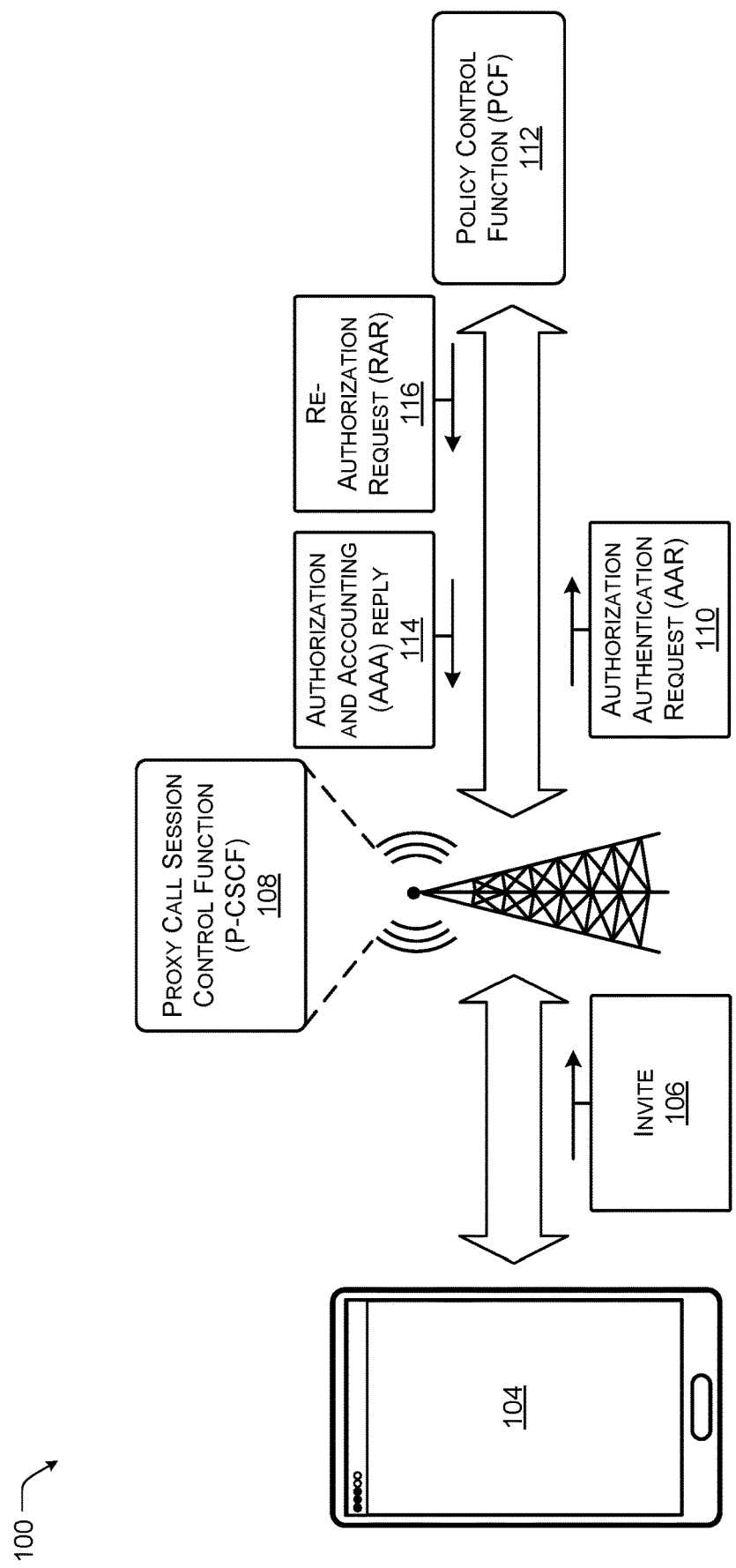
FIG. 1 is an example of a block diagram of a network configured to track radio access technology associated with voice calls, in accordance with some examples of the present disclosure.

Discussed herein are systems, architectures, and methods associated with networks for providing cellular services to multiple user equipment (UE) via multiple standards and/or call types. As discussed herein, both networks and connected UEs may rely on multiple standards to facilitate communication and calls between users of the system. As the user moves from location to location, the UEs may transition between different standards or Radio Access Technology (RAT) types (e.g., 3G, 4G, 5G, LTE, and the like) and/or the network may transition the UEs between RAT types during specific types of interaction to improve call quality, bandwidth usage, and the like. Discussed herein, is a network architecture and systems to allow the network to record and track RAT type usage on a per call basis and/or sub-call basis. In this manner, if an issues or errors occur during a call, the network may identify the particular system based on the RAT type being utilized to facilitate the communication at the time the issue or error occurred. Thus, unlike, conventional systems that fail to track and record call types or standards used during a call, the network discussed herein, reduces down time of the network caused by identifying and debugging issue or error occurring with respect to the network.

In some examples, the network architecture may be configured with a proxy call session control function (P-CSCF) in communication with at least one UE and a policy control function (PCF) to establish dedicated bearers for calls associated with the UE. In the network discussed herein, the P-CSCF may be configured to track and record the RAT types associated with a call and/or transitions between RAT types during a call. The P-CSCF as well as an online charging function (OCS) and/or a charging function (CHF) may, in some examples, be configured to rely on RAT types reported by the PCF opposed to those reported by the UE as part of the invite or call initiation. In this manner, the network and/or charging station, discussed herein, may maintain more accurate tracking of RAT types compared to conventional systems that may utilize reports generated by individual UEs.

In some cases, the UE may transmit an invite including location data associated with the UE. For example, the UE may send an invite including a header that indicates a current cellular site or tower and/or a current radio access technology (RAT) type. In this example, the P-CSCF may pass the invite to an IP multimedia subsystem (IMS) core. Once the IMS core provides a response, the P-CSCF may send an Authorization Authentication Request (AAR) to the PCF to initiate a request to establish a dedicated bearer. At this time, the PCF may return an Authorization and Accounting (AAA) reply that includes a current or first RAT type (e.g., 5G) for the call.

As the dedicated bearer is established, the UE may transition to a second RAT type (e.g., 4G), as the UE may transition from 5G to 4G to, for example, reduce bandwidth usage during the call session. In this example, responsive to the transition to the second RAT type, the PFC may send a Re-Authorization Request (RAR) to the P-CSCF notifying the P-CSCF as to the transition from the first RAT type to the second RAT type. In this example, once the call is answered, the P-CSCF may report the call type as a fallback type (or, in this example transiting from 5G to 4G/LTE an Evolved Packet System (EPS) fallback type). In some cases, the P-CSCF may also report the first RAT type, the second RAT type, a time stamp or clock signal associated with the transition, and the like to, for instance, the PCF as well as the OCS and/or the CHF. In some cases, if the UE transitioned back to 5G or to a third RAT type (e.g., 3G), the P-CSCF may receive additional RAR from the PFC and report or send the number of transitions, the RAT types associated with the transitions, and/or time stamps or clock signals associated with each individual transition. In this manner, the network may be able to track specific systems, hardware, software, and the like being utilized if and when an issue occurs on the network, thereby reducing complexity associated with identifying and/or debugging the issue.

As another example, the UE may again transmit an invite including a header that indicates a current cellular site or tower and/or a current RAT type (such as 5G). However, in this example, the call may be a voice over new radio (VoNR) call. In this case, when the call is answered, the call is still on the current RAT type (e.g., 5G) and the P-CSCF may report the call type as a VoNR call and the current RAT type (e.g., 5G), as the P-CSCF may determine that there was no transition in RAT type prior to the answer.

In some examples, the UE may initiate the call using a first RAT type (e.g., 5G) and prior to the answer, the UE may transition to a second RAT type (e.g., 4G/LTE). In these examples, the UE may send an acknowledgement (ACK) to the P-CSCF during the initiation process. The acknowledgement may include an indication of the transition to the second RAT type. In this example, the PCF may not establish a dedicated bearer and, accordingly, the P-CSCF may not receive an AAA reply confirming the second RAT type (e.g., 4G/LTE). In this situation, the P-CSCF may designate the call as a fallback type and report the fallback status and/or the first RAT type, the second RAT type, a time stamp or clock signal associated with the transition, and the like, to the PCF. In some cases of the example above, the UE may not transition to a second RAT type. In these cases, the ACK sent by the UE may still include the second RAT type but the second RAT type may equal the first RAT type. In response, the P-CSCF may determine that the first and second RAT types are the same and report the call as a VoNR and/or the first RAT type to the PCF as well as the OCS and/or the CHF.

In some cases, the P-CSCF may continue to track the RAT changes that occur during a call, such as when a user moves from one coverage area to another. In these cases, during the call (e.g., after the answer and the call is established), the PCF may send an additional RAR to the P-CSCF that is responsive to and indicates a RAT change on the UE. In these cases, the P-CSCF may record and store an indication of, a time of, and the RAT types associated with the transition or handover that occurred during the call. In these cases, when the P-CSCF reports to the PCF, the P-CSCF may include the number of handovers, the time stamps associated with the handovers, the RAT types associated with the handovers, and the like.

FIG. 1 is an example of a block diagram of a network 100 configured to RAT types associated with voice calls, in accordance with some examples of the present disclosure. In the illustrated example, a UE 104 may be connected to the network 100 and initiate a call by sending an invite 106 including location data associated with the UE 104 to a P-CSCF 108 of the network 100. For example, the invite 106 may include a header that indicates a current cellular site or tower and/or a current RAT type (e.g., a first RAT type). In this example, the P-CSCF 108 may send an AAR 110 to a PCF 112 to establish a dedicated bearer. At this time, the PCF 112 may return an Authorization and Accounting (AAA) reply 114 that includes the first RAT type (e.g., 5G) for the call.

As the dedicated bearer is established, the UE 104 may transition to a second RAT type (e.g., 4G), as the UE 104 may transition from 5G to 4G to, for example, reduce bandwidth usage during the call session. In this example, responsive to the transition to the second RAT type, the PCF 112 may send a Re-Authorization Request (RAR) 116 to the P-CSCF 108 notifying the P-CSCF 108 as to the transition from the first RAT type to the second RAT type. In this example, once the call is answered, the P-CSCF 108 may report the call type to the network 100. In this example, the call type may be a fallback type (e.g., the call transited from 5G to 4G/LTE). In other examples, the call, such as during VoNR calls, may remain on the first RAT type. In these examples, the PCF does not send the RAR 116 and the P-CSCF 108 may send a call type indicating the first RAT type and/or that the call was a VoNR type, as the RAT type does not transition.

In some cases, the P-CSCF 108 may also report the first RAT type, the second RAT type, a time stamp or clock signal associated with the transition, and the like. In some cases, if the UE 104 may transition back and forth between 5G and 4G/LTE (or to a third RAT type, such as 3G), the P-CSCF 108 may receive additional RARs (not shown) from the PCF 112 and report or send the number of transitions, the RAT types associated with the transitions, and/or time stamps or clock signals associated with each individual transition. In this manner, the network 100 may be able to track specific systems, hardware, software, and the like being utilized if and when an issue occurs on the network, thereby reducing complexity associated with identifying and/or debugging the issue.

In some cases, the P-CSCF 108 may also report the first RAT type, the second RAT type, a time stamp or clock signal associated with the transition, and the like to an OCS, a CHF, and/or other charging platform (not shown). In some cases, the charging platform may respond with a response to acknowledge the report and initiate/continued charging of the UE 702 depending on the charging platform type.

FIGS. 2-6 are flow diagrams illustrating example processes associated with tracking RAT types and call types according to some implementations. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 2 is an example flow diagram showing an illustrative process 200 associated with tracking at a P-CSCF of a network handover type call, in accordance with some examples of the present disclosure. As discussed above, when debugging or tracking issues with the network, it may be important to link the call that experienced an issue to the particular hardware or call type at the time of the issue. By detecting the call type, the debugging time and costs may be reduced with respect to conventional networks.

At 202, the P-CSCF may receive, from a UE, a call invite including location data associated with the UE. For example, the invite may include a header that indicates a currently connected cellular site or tower. In some cases, the header may include multiple cellular sites or towers within range of the UE. In some instances, the invite may also indicate a first RAT type that the UE is currently using to connect to the network.

At 204, the P-CSCF may send to a PCF a request including the location data and, at 206, the P-CSCF may receive, from the PCF, a reply that includes or indicates the first RAT type. For example, the P-CSCF may send an AAR to a PCF to establish a dedicated bearer. At this time, the PCF may return the AAA reply that includes the first RAT type for the call. In this example, the first RAT type may be the RAT type at the time the dedicated bearer is established with the UE.

At 208, the P-CSCF may receive from the PCF a response, the response including a second RAT type. For example, as the dedicated bearer is established, the UE may transition to a second RAT type. For instance, the UE may transition from 5G to 4G to reduce bandwidth usage during the call session. In this example, responsive to the transition to the second RAT type, the PCF may send a RAR to the P-CSCF notifying the P-CSCF as to the transition from the first RAT type to the second RAT type.

At 210, the P-CSCF may determine that a call associated with the invite is answered by a receiving or second UE and, at 212, the P-CSCF may determine the call type in response to the call being answered. For example, the P-CSCF may determine the call type as a fallback call type based at least in part on a comparison of the first RAT type to the second RAT type (e.g., the call type is fallback if the first RAT type differs from the first RAT type). As one specific example, the UE may transition from 5G to 4G/LTE and the C-CSCF may report the call type as EPS fallback.

At 214, the P-CSCF may send an indication of the call type (e.g., fallback) that may be recorded and/or stored by the network for use in debugging and issue detection by, for instance, a debugging engineer. In some cases, the P-CSCF may also report the call type to an OCS, a CHF, and/or other charging platform. In some cases, the charging platform may respond with a response to acknowledge the report and initiate/continued charging of the UE depending on the charging platform type.

FIG. 3 is an example flow diagram showing an illustrative process 300 associated with tracking at a P-CSCF of a network voice over new radio type calls, in accordance with some examples of the present disclosure. As discussed above, when debugging or tracking issues with the network, it may be important to link the call that experienced an issue to the particular hardware or call type at the time of the issue. By detecting the call type, the debugging time and costs may be reduced with respect to conventional networks. In this example, the P-CSCF may track and record the RAT type associated with a VoNR call.

At 302, the P-CSCF may receive, from a UE, a call invite including location data associated with the UE. For example, the invite may include a header that indicates a currently connected cellular site or tower. In some cases, the header may include multiple cellular sites or towers within range of the UE. In some instances, the invite may also indicate a first RAT type that the UE is currently using to connect to the network.

At 304, the P-CSCF may send to a PCF a request including the location data and, at 206, the P-CSCF may receive, from the PCF, a reply that includes or indicates the first RAT type. For example, the P-CSCF may send an AAR to a PCF to establish a dedicated bearer. At this time, the PCF may return the AAA reply that includes the first RAT type for the call. In this example, the first RAT type may be the RAT type at the time the dedicated bearer is established with the UE.

At 308, the P-CSCF may receive from the PCF a response, the response including a second RAT type. For example, as the dedicated bearer is established, the UE may transition to a second RAT type. For instance, the UE may transition from 5G to 4G to reduce bandwidth usage during the call session. In this example, responsive to the transition to the second RAT type, the PCF may send a RAR to the P-CSCF, notifying the P-CSCF as to the transition from the first RAT type to the second RAT type.

At 310, the P-CSCF may determine that the first RAT type equals the second RAT type. For example, the P-CSCF may compare the first RAT type to the second RAT type. In another example, the P-CSCF may compare the second RAT type to a stored current RAT type or the like associated with the call.

At 312, the P-CSCF may determine a call type in response to the first RAT type equaling the second RAT type. For example, the P-CSCF may determine that the call type is a VoNR call when the first RAT type and the second RAT type are equal, the same, or otherwise similar technologies.

At 314, the P-CSCF may send an indication of the call type (e.g., VoNR) that may be recorded and/or stored by the network for use in debugging and issue detection by, for instance, a debugging engineer. In some cases, the P-CSCF may also report the call type to an OCS, a CHF, and/or other charging platform. In some cases, the charging platform may respond with a response to acknowledge the report and initiate/continued charging of the UE depending on the charging platform type.

FIG. 4 is an example flow diagram showing an illustrative process 400 associated with tracking at a proxy call session control function of a network handover type call, in accordance with some examples of the present disclosure. For example, the invite may include a header that indicates a currently connected cellular site or tower. In some cases, the header may include multiple cellular sites or towers within range of the UE. In this example, the P-CSCF may not be able to rely on RAT types provided by the PCF. Accordingly, the P-CSCF may utilize the RAT types provided by the UE to determine a call type.

At 402, the P-CSCF may receive, from a UE, a call invite including a first RAT type. For example, the UE may send an invite with a header that indicates a currently connected cellular site or tower and the RAT type that the UE is currently using to connect to the network. In some cases, the header may include multiple cellular sites or towers within range of the UE.

At 404, the P-CSCF may receive an acknowledgment associated with an answer of the call including a second RAT type. For example, when the call is answered, the UE may re-report to the P-CSCF the current RAT type.

At 406, the P-CSCF may determine a call type based at least in part on the first RAT type and the second RAT type. For example, if the RAT types differ the call type may be a fallback type and if the RAT types are the same the call type may be VoNR, 5G, 4G/LTE, or the like.

At 408, the P-CSCF may send an indication of the call type that may be recorded and/or stored by the network for use in debugging and issue detection by, for instance, a debugging engineer. In some cases, the P-CSCF may also report the call type to an OCS, a CHF, and/or other charging platform. In some cases, the charging platform may respond with a response to acknowledge the report and initiate/continued charging of the UE depending on the charging platform type.

FIG. 5 is an example flow diagram showing an illustrative process 500 associated with tracking at a proxy call session control function of a network voice over new radio type call, in accordance with some examples of the present disclosure. For example, the invite may include a header that indicates a currently connected cellular site or tower. In some cases, the header may include multiple cellular sites or towers within range of the UE. In this example, the P-CSCF may not be able to rely on RAT types provided by the PCF. Accordingly, the P-CSCF may utilize the RAT types provided by the UE to determine a call type.

At 502, the P-CSCF may receive, from a UE, a call invite including a first RAT type. For example, the UE may send an invite with a header that indicates a currently connected cellular site or tower and the RAT type that the UE is currently using to connect to the network. In some cases, the header may include multiple cellular sites or towers within range of the UE.

At 504, the P-CSCF may receive an acknowledgment associated with an answer of the call including a second RAT type. For example, when the call is answered, the UE may re-report to the P-CSCF the current RAT type.

At 506, the P-CSCF may determine that the first RAT type equals the second RAT type. For example, the P-CSCF may compare the first RAT type to the second RAT type. In another example, the P-CSCF may compare the second RAT type to a stored current RAT type or the like associated with the call.

At 508, the P-CSCF may determine a call type in response to the first RAT type equaling the second RAT type. For example, the P-CSCF may determine that the call type is a VoNR call when the first RAT type and the second RAT type are equal, the same, or otherwise similar technologies.

At 510, the P-CSCF may send an indication of the call type (e.g., VoNR) that may be recorded and/or stored by the network for use in debugging and issue detection by, for instance, a debugging engineer. In some cases, the P-CSCF may also report the call type to an OCS, a CHF, and/or other charging platform. In some cases, the charging platform may respond with a response to acknowledge the report and initiate/continued charging of the UE depending on the charging platform type.

Figure 6:
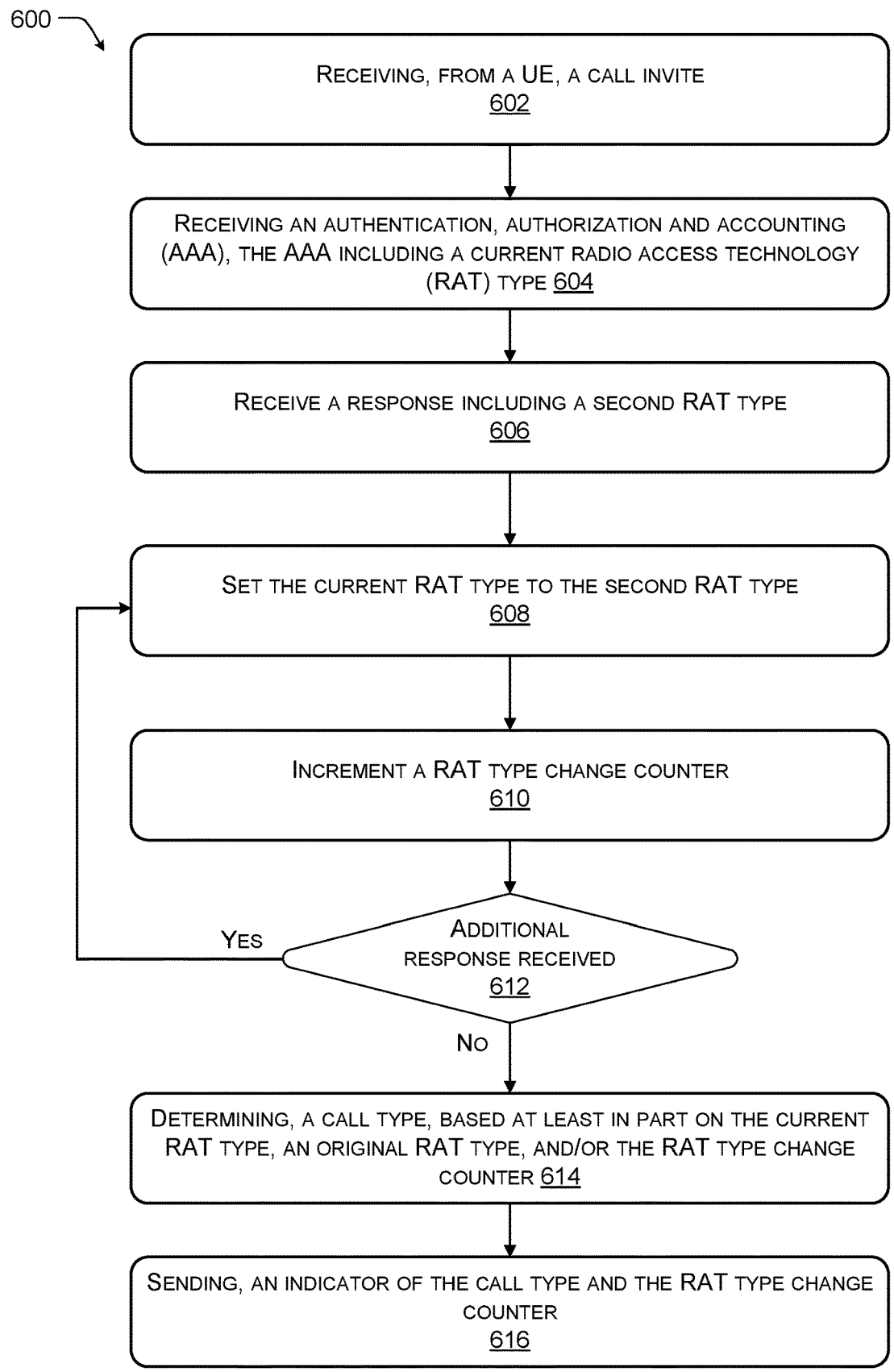
FIG. 6 is an example flow diagram showing an illustrative process associated with tracking at a proxy call session control function of a network handover type call, in accordance with some examples of the present disclosure.

FIG. 6 is an example flow diagram showing an illustrative process 600 associated with tracking at a proxy call session control function of a network handover type call, in accordance with some examples of the present disclosure. As discussed above, when debugging or tracking issues with the network, it may be important to link the call that experienced an issue to the particular hardware or call type at the time of the issue. By detecting the call type, the debugging time and costs may be reduced with respect to conventional networks.

At 602, the P-CSCF may receive, from a UE, a call invite including location data associated with the UE. For example, the invite may include a header that indicates a currently connected cellular site or tower. In some cases, the header may include multiple cellular sites or towers within range of the UE.

At 604, the P-CSCF may receive, from a PCF, an AAA including a current RAT type associated with the call. In some cases, the AAA may be in response to an AAR sent from the P-CSCF to the PCF. The AAR may include the location data. For example, the P-CSCF may send an AAR to a PCF to establish a dedicated bearer. At this time, the PCF may return the AAA reply that includes the current RAT type for the call.

At 606, the P-CSCF may receive, from the PCF, a response including a second RAT type. For example, as the dedicated bearer is established, the UE may transition to a second RAT type. For instance, the UE may transition from 5G to 4G to reduce bandwidth usage during the call session. In this example, responsive to the transition to the second RAT type, the PCF may send a RAR to the P-CSCF notifying the P-CSCF as to the transition from the first RAT type to the second RAT type. In other instances, the UE may remain on the current RAT type and the second RAT type may correspond or equal the current RAT type.

At 608, the P-CSCF may set the current RAT type to the second RAT type and, at 610, the P-CSCF may increment a RAT type change counter. Th P-CSCF may also store or record the original RAT type and each subsequent change in, for instance, a ledger or table.

At 612, the P-CSCF may receive an additional response from the PCF. The additional response may include an additional RAT type. For example, the UE may have again transitioned between RAT types (e.g., 4G back to 5G or from 4G to 3G, or the like). In this case, the process 600 may return to 608 and the P-CSCF may update the current RAT type and record the change in RAT type (e.g., via a counter, ledger, table, or the like).

If no additional responses are received from the PCF and/or no additional RAT changes occur, the process 600 may advance to 614. At 614, the P-CSCF may determine a call type based at least in part on the current RAT type, an original RAT type, and/or the RAT type change counter. For example, if the RAT type is maintained during the call, the call type may be VoNR. While if the RAT type transitions back and forth between, for instance, 4G to 5G, the call type may be fallback.

At 616, the P-CSCF may send an indication of the call type and the RAT type change counter that may be recorded and/or stored by the network for use in debugging and issue detection by, for instance, a debugging engineer. In some cases, the RAT type change counter may be utilized to track a number of handovers that occurred during a call to again assist in determining the correct technology and/or equipment when an issue occurs during a call on the network. In some cases, the P-CSCF may also report the call type to an OCS, a CHF, and/or other charging platform. In some cases, the charging platform may respond with a response to acknowledge the report and initiate/continued charging of the UE depending on the charging platform type.

Figure 7:
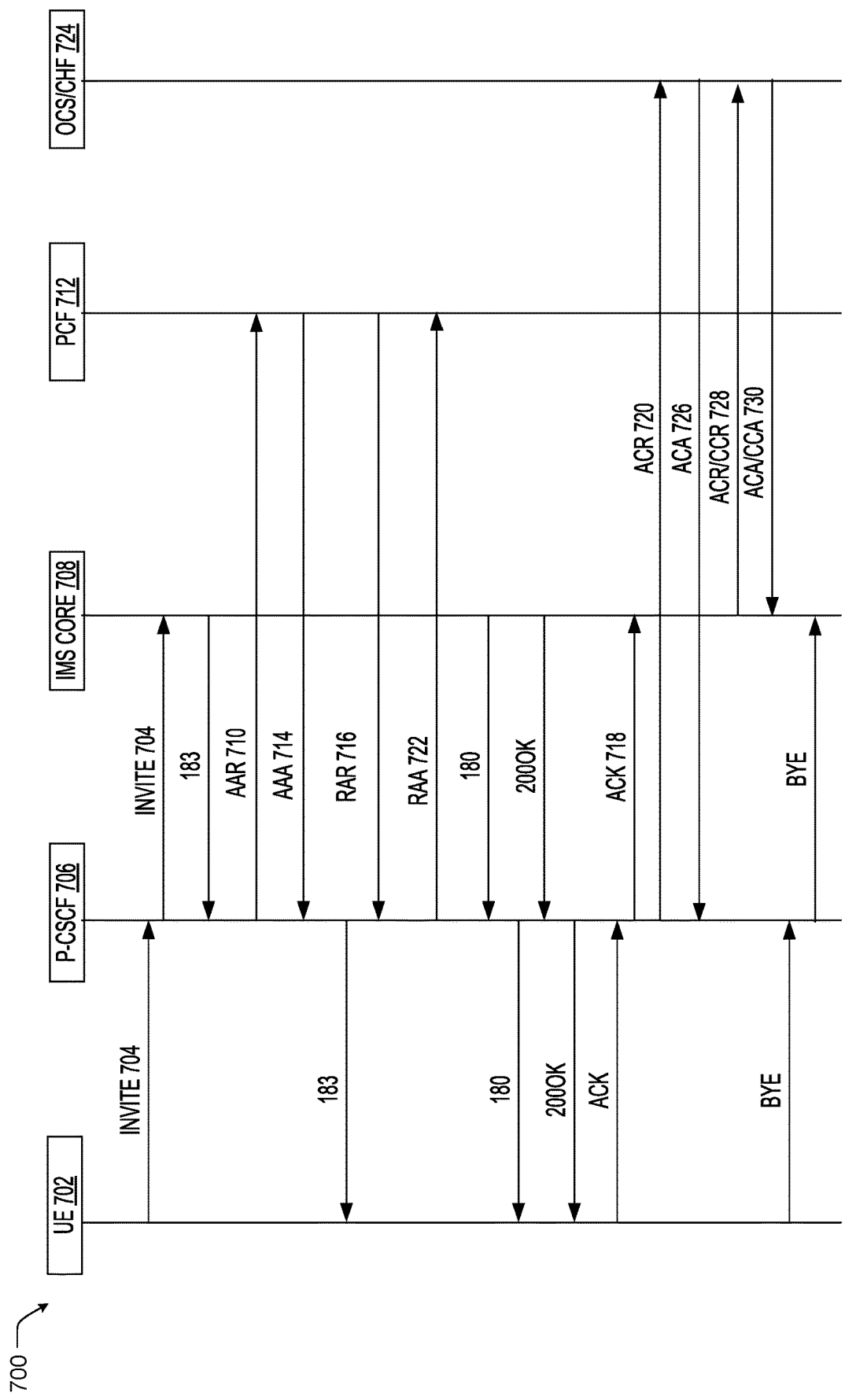
FIG. 7 is an example of a data flow diagram for tracking and recording types and handovers associated with a call, in accordance with some examples of the present disclosure.

FIG. 7 is an example of a data flow diagram 700 for tracking and recording types and handovers associated with a call, in accordance with some examples of the present disclosure. In the current example, a UE 702 may be initiating a voice call to a receiving device, while the UE 702 is currently accessing a network via a first RAT type. To initiate the call, the UE 702 may send an invite 704 to a P-CSCF 706 of the network. In this example, the P-CSCF 706 may forward the invite 704 to an IMS core 708 of the network. In some examples, the invite 704 may include location data (such as a header that indicates a currently connected cellular site or tower) and/or the first RAT type.

The P-CSCF 706 may also send a request 710 (such as an AAR) including the location data and/or RAT type to a PCF 712. The PCF 712 may reply to the request 710 of the P-CSCF 706 by returning an AAA 714. The AAA 714 may include an indication of a RAT type associated with the call. For example, the RAT type associated with the call may be the RAT type at the time the dedicated bearer is established with the UE 702 (e.g., the first RAT type).

In the current example, the PCF 712 may send a RAR 716 to the P-CSCF 706 at a period of time after sending the AAA 714. The RAR 716 may include or otherwise indicate a second RAT type (e.g., a RAT type differing form the first RAT type and/or the RAT type associated with the call). For example, as the dedicated bearer is established by the PCF 712, the UE 702 may be transition to the second RAT type to reduce network resource consumption during the call. For instance, the UE 702 may transition from 5G to 4G to reduce bandwidth consumption during the voice call session. In this example, responsive to the transition to the second RAT type, the PCF 712 may send the RAR 716 to the P-CSCF 706 to notify the P-CSCF 706 as to the change. The PCF 712 may note, store, and/or record the change in RAT types. In some cases, the RAR 716 may be associated with a service based interface. Responsive to receiving the RAR 716, the P-CSCF 706 may also return a RAA message 722 (such as a configuration message) to the PCF 712.

In this example, the invite 704 may be answered, for example, by the receiving device. When the invite 704 is answered the P-CSCF 706 may determine a call type. For example, the P-CSCF 706 may determine the call type as a fallback call type based at least in part on a comparison of the first RAT type to the second RAT type (e.g., the call type is fallback if the first RAT type differs from the first RAT type). For example, in this specific example, the UE 702 may transition from 5G (e.g., the first RAT type) to 4G/LTE (e.g., the second RAT type). Once the call type is determined the P-CSCF 706 may send an ACK 718 to the IMS core 708 indicating the call type. The P-CSCF 706 may also send an ACR 720 to a charging platform (e.g., an OCS/CHF 724) indicating the call type. Accordingly, in this example, the P-CSCF 706 may report the call type as EPS fallback (e.g., as transiting from 5G to 4G/LTE). In some cases, the IMS core 708 may also send a report (ACR/CCR) 728 to and receive an acknowledgement (ACA/CCA) 730 from the OCS/CHF 724 associated with the call type.

Figure 8:
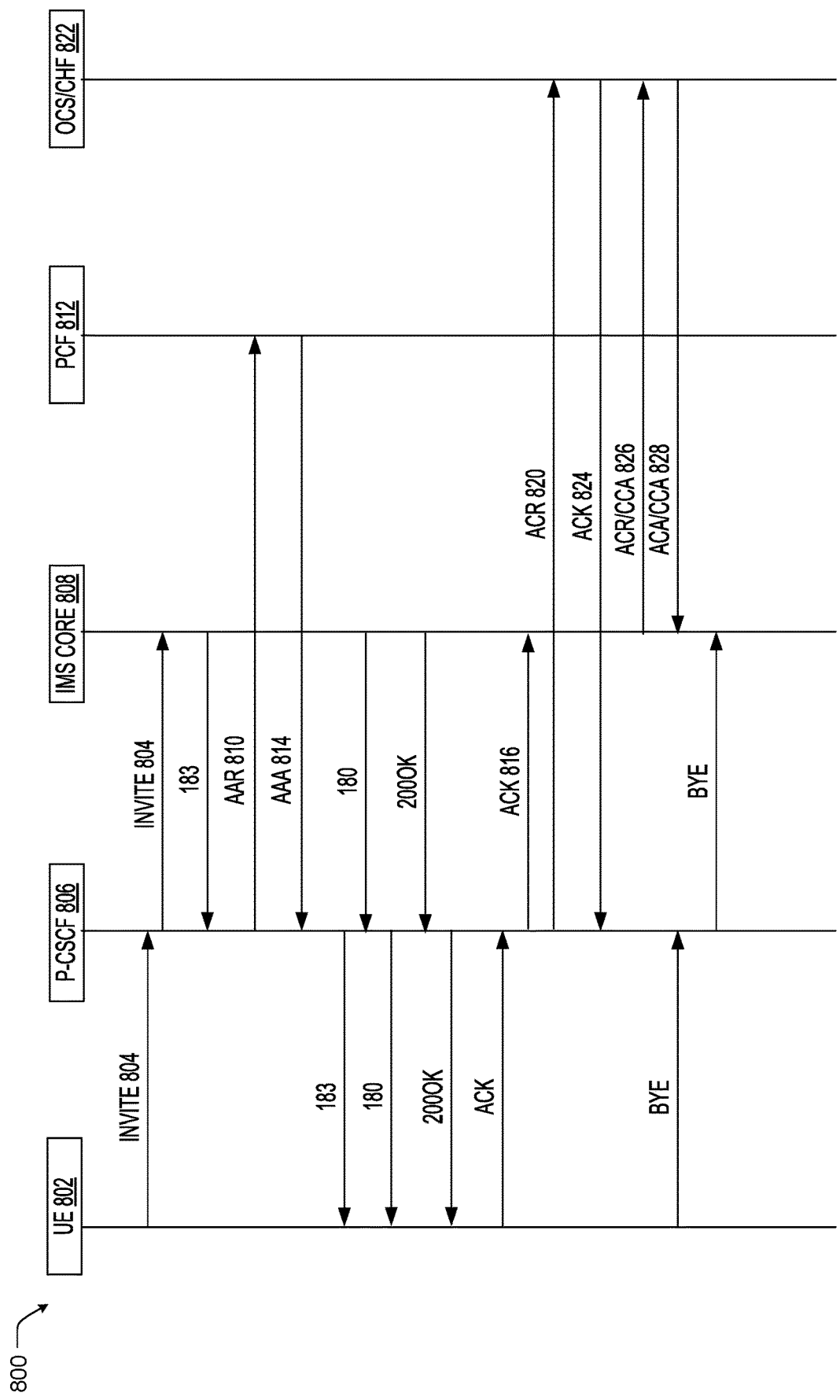
FIG. 8 is an example of a data flow diagram for tracking and recording types and handovers associated with a call, in accordance with some examples of the present disclosure.

FIG. 8 is an example of a data flow diagram 800 for tracking and recording types and handovers associated with a call, in accordance with some examples of the present disclosure. In illustrated example, the UE 802 may be placing a VoNR call to a receiving device. In this example, the UE 802 may remain connected to the network using a single RAT type for the duration of the call.

In this example, the UE 802 may send an invite 804 to the P-CSCF 806 of the network. In this example, the P-CSCF 806 may forward the invite 804 to an IMS core 808 of the network. In some examples, the invite 804 may include location data (such as a header that indicates a currently connected cellular site or tower) and/or the first RAT type.

The P-CSCF 806 may also send a request 810 (such as an AAR) including the location data and/or RAT type to a PCF 812. The PCF 812 may reply to the request 810 of the P-CSCF 806 by returning an AAA 814. The AAA 814 may include an indication of a RAT type associated with the call. For example, the RAT type associated with the call may be the RAT type at the time the dedicated bearer is established with the UE 702 (e.g., the first RAT type).

However, unlike the example of FIG. 7, the PCF 812 does not send a RAR indicating that the RAT type has changed prior to the receiving device answering the invite 804. Accordingly, in this example, the P-CSCF 806 may determine that the call type is VoNR as there was no change in RAT type following the establishment of the dedicated bearer. Once the call type is determined the P-CSCF 806 may send an ACK 816 to the IMS core 808 indicating the call type and the IMS core 808 may send an ACR 818 to the PCF 812 indicating the call type. The P-CSCF 806 may also send an ACR 820 to a charging platform (e.g., an OCS/CHF 822) indicating the call type and receive an acknowledgment (ACK 824) from the OCS/CHF 822 in response. In some cases, the IMS core 808 may also send a report (ACR/CCR) 826 to and receive an acknowledgement (ACA/CCA) 828 from the OCS/CHF 822 associated with the call type.

Figure 9:
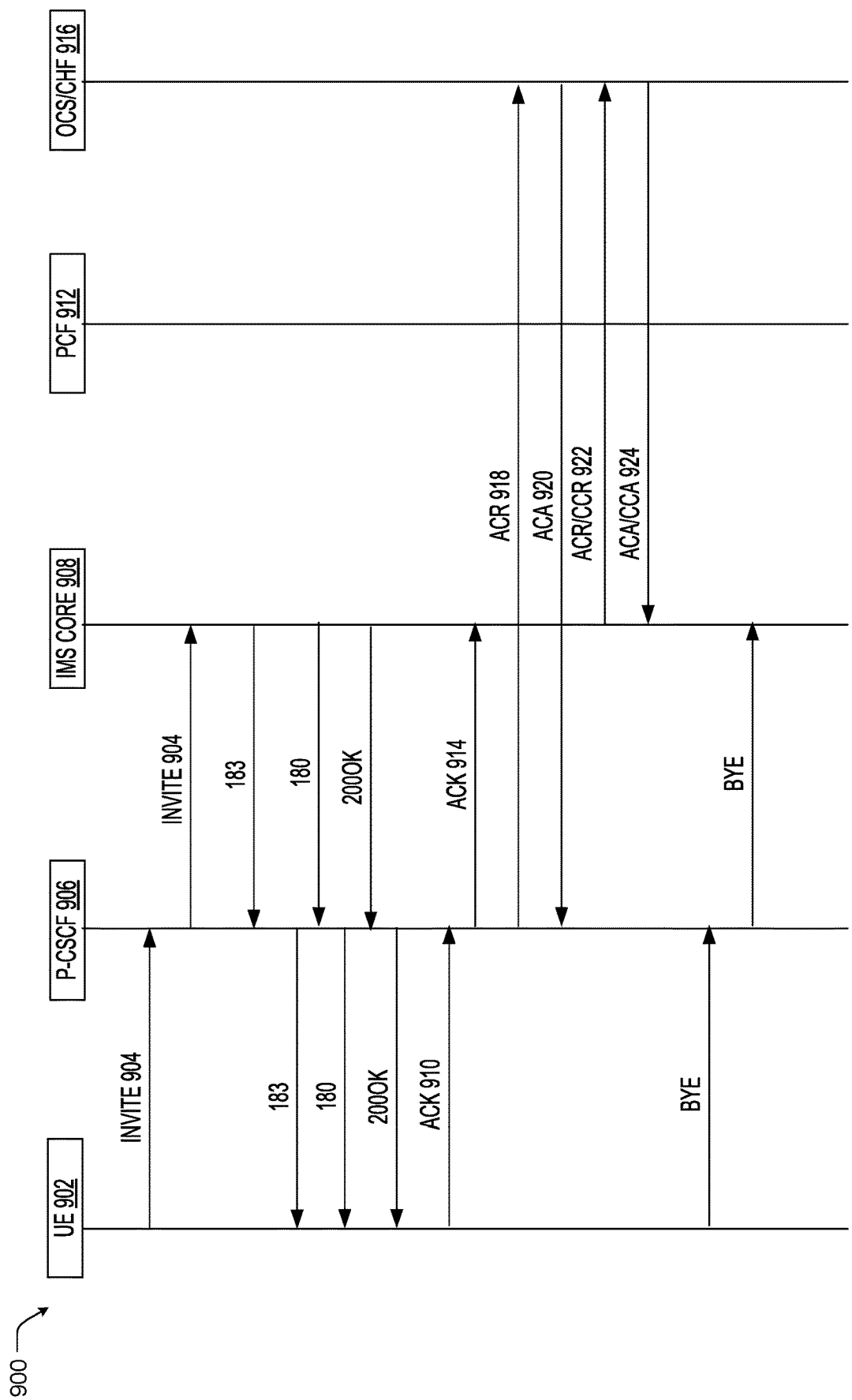
FIG. 9 is an example of a data flow diagram for tracking and recording types and handovers associated with a call, in accordance with some examples of the present disclosure.

FIG. 9 is an example of a data flow diagram 900 for tracking and recording types and handovers associated with a call, in accordance with some examples of the present disclosure. In the current example, the UE 902 may be placing a call to a receiving device on a network or cellular site that is not implementing provider subscriber location information (NPLI), such as when the UE 902 is roaming.

In this example, the UE 902 may again send an invite 904 to the P-CSCF 906 of the network. In this example, the P-CSCF 906 may forward the invite 904 to an IMS core 908 of the network. In this examples the invite 904 may include location data and does include a first RAT type or current RAT type. In this example, the P-CSCF 906 does not receive an AAA nor a RAR from the PCF 912. However, the P-CSCF 906 may receive an ACK 910 from the UE 902. The ACK 910 may include a second RAT type. In this example, as the P-CSCF 906 does not receive an AAA nor a RAR from the PCF 912, the P-CSCF 906 may determine the call type based on the invitation 904 and the ACK 910 received from the UE 902. Here, for instance, if the first RAT type differs from the second RAT type, then the P-CSCF 906 may denote or record the call as a fallback. For example, if the first RAT type was 5G and the second RAT type was 4G/LTE, the P-of CSCF 906 may denote or record the call type as 5G-4G fallback. In another instance if the first RAT and the second RAT were the same, the P-CSCF 906 may denote or record the call type as VoNR. Once, the call type is determined by the P-CSCF 906 and/or the invite is answered by the receiving UE, the P-CSCF 906 may report the call type via an ACK 914 to the IMS core 908 as well as to a charging platform (e.g., an OCS/CHF 916) via ACR 918. The OCS/CHF 916 may reply to the P-CSCF 906 with an acknowledgement (ACA 920). In some cases, the IMS core 908 may also send a report (ACR/CCR) 922 to and receive an acknowledgement (ACA/CCA) 924 from the OCS/CHF 916 associated with the call type.

Figure 10:
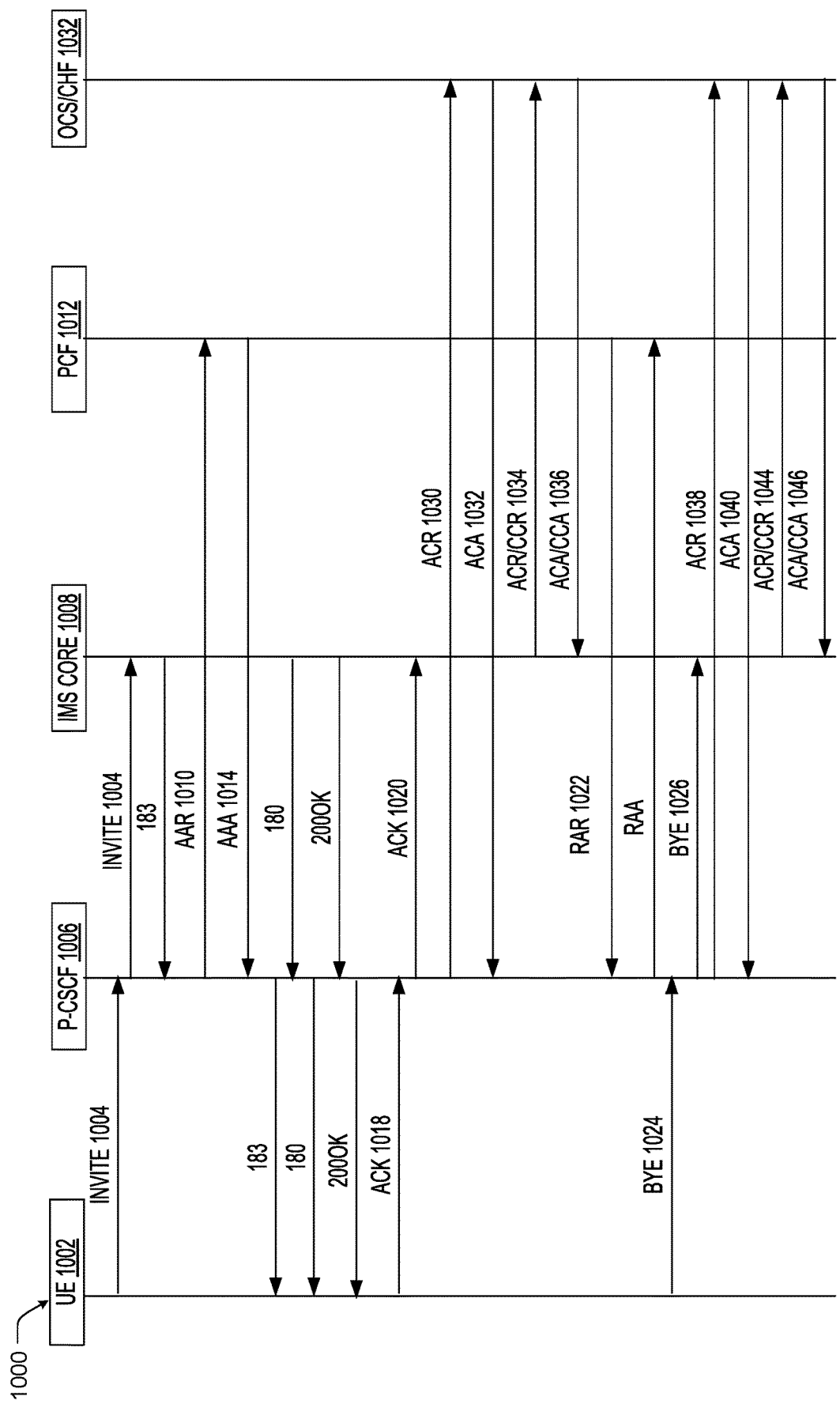
FIG. 10 is an example of a data flow diagram for tracking and recording types and handovers associated with a call, in accordance with some examples of the present disclosure.

FIG. 10 is an example of a data flow diagram 1000 for tracking and recording types and handovers associated with a call, in accordance with some examples of the present disclosure. In some cases, the call may initiate as a VoNR and/or fallback call type and the P-CSCF may report the call type upon answer by a receiving device. However, in the illustrated example, the call may transition between RAT types during the call, such as when a user transitions from a coverage area associated with a first cellular site to a second coverage area associated with a second cellular site or the like.

In the current example, a UE 1002 may be initiating a voice call to a receiving device, while the UE 1002 is currently accessing a network via a first RAT type. To initiate the call, the UE 1002 may send an invite 1004 to a P-CSCF 1006 of the network. In this example, the P-CSCF 1006 may forward the invite 1004 to an IMS core 1008 of the network. In some examples, the invite 1004 may include location data (such as a header that indicates a currently connected cellular site or tower) and/or the first RAT type.

The P-CSCF 1006 may also send an AAR 1010 including the location data and/or RAT type to a PCF 1012. The PCF 1012 may reply to the request 1010 of the P-CSCF 1006 by returning an AAA 1014. The AAA 1014 may include an indication of a RAT type associated with the call. For example, the RAT type associated with the call may be the RAT type at the time the dedicated bearer is established with the UE 1002 (e.g., the first RAT type).

In this example, the invite 1004 may be answered, for example, by the receiving device and the UE 1002 may provide an ACK 1018 to the P-CSCF 1006, as discussed above. When the invite 1004 is answered the P-CSCF 1006 may determine a call type. For example, the P-CSCF 1006 may determine the call type as a VoNR or fallback call type based at least in part on a comparison of the first RAT type to the second RAT type (e.g., the call type is fallback if the first RAT type differs from the first RAT type and VoNR if the first and second RAT types are the same). Once the call type is determined the P-CSCF 1006 may send an ACK 1020 to the IMS core 1008 indicating the call type and the IMS core 1008 may send an ARC 1030 to the PCF 1012 indicating the call type.

The P-CSCF 1006 may also send a report (ACR 1030) to a chagrining platform (e.g., OCS/CHF 1032) indicating the call type and, in response, receive an acknowledgment (ACA 934). In some case, the IMS core 1008 may confirm the call type with the OCS/CHF 1032 via a report (ACR/CCR 1034) and responsive acknowledgment (ACA/CCA 1036).

In this example, the UE 1002 may transition RAT types again, such as to a third RAT type or back to the first RAT type. As an illustrative example, the UE 1002 may transition from coverage via a first cellular site configured to provide support via the second RAT type to coverage associated with a second cellular site configured to provide support via the third RAT type. In another example, the usage of the second RAT type with respect to the current cellular site may have increased such that to maintain call quality the network may transition the UE 1002 to the third RAT type. In this example, when the network transition the RAT type associated with the call, the PCF 1012 may send a RAR 1022 (e.g., in this case a second RAR) to the P-CSCF 1006. The RAR 1022 may include or otherwise indicate the third RAT type. In some cases, the RAR 1022 may be a service based interface. The P-CSCF 1006 may store or otherwise record the change in RAT type. In this example, the UE 1002 provides a notification of the call termination via BYE 1024 to the P-CSCF 1006 after receiving only the second RAR 1022. However, it should be understood that the UE 1002 may undergo additional RAT type changes throughout the time period associated with the call. In these case, the PCF 1012 may send additional RARs (not shown) including additional RAT types to the P-CSCF 1006. The P-CSCF 1006 may record each RAT type change and tally or maintain a counter of a number of RAT type changes associated with the call.

The P-CSCF 1006 may also send a report (ACR 1038) to the OCS/CHF 1032 indicating the additional RAT types. The OCS/CHF 1032 may reply via acknowledgment (ACA 1040). Again, the IMS core 1008 may confirm the call type with the OCS/CHF 1032 via a report (ACR/CCR 2044) and responsive acknowledgment (ACA/CCA 1046). The P-CSCF 1006 may then report the RAT types, the number of RAT type changes, timestamps associated with each change in RAT type, and the like to the PCF 1012 via, for instance, BYE 1026 and ACR 1028 as illustrated.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    receiving, at a proxy-call session control function (P-CSCF) of a network, an invite from an originating user equipment (UE);
    receiving, at the P-CSCF, an authorization and Accounting (AAA) from a policy control function (PCF), the AAA indicating a first radio access technology (RAT) type;
    storing the first RAT type;
    receiving, at the P-CSCF, a re-authorization request (RAR) from the PCF, the RAR indicating a second RAT type;
    storing the second RAT type;
    determining a call type based at least in part on the first RAT type and the second RAT type; and
    sending, to a second component of the network, an indication of the call type and at least one of (A) the first RAT type and the second RAT type or (B) a RAT type change counter.

2. The method as claim 1 recites, wherein determining the call type further comprises determining the call type as a fallback call type based on a difference in the first RAT type and the second RAT type.

3. The method as claim 1 recites, wherein determining the call type further comprises determining the call type as a voice over new radio (VoNR) type based on the first RAT type equaling the second RAT type.

4. The method as claim 1 recites, wherein the RAR is a first RAR and the method further comprises:
    receiving, at the P-CSCF, a second RAR from the PCF, the second RAR indicating a third RAT type; and
    wherein determining the call type based at least in part on the third RAT type.

5. The method as claim 4 recites, further comprising:
    in response to determining the third RAT type differs from the second RAT type, incrementing the RAT type change counter; and
    sending the RAT type change counter with the indication of the call type to the second component of the network.

6. The method as claim 5 recites, further comprising:
    sending the first RAT type, the second RAT type, and the third RAT type with the indication of the call type to the second component of the network.

7. The method as claim 1 recites, wherein the second component of the network is at least one of:
    an IP multimedia subsystem (IMS) core; or
    the PCF.

8. The method as claim 1 recites, wherein sending the indication of the call type to the second component of the network is responsive to the invite being answered by a receiving UE.

9. A system comprising:
    one or more processors; and
    programming instructions that, when executed by the one or more processors, implement a proxy-call session control function (P-CSCF) of a network to perform operations including:
        receiving an invite from an originating user equipment (UE);

receiving an authorization and Accounting (AAA) from a policy control function (PCF), the AAA indicating a first radio access technology (RAT) type;

storing the first RAT type;

receiving a re-authorization request (RAR) from the PCF, the RAR indicating a second RAT type;

storing the second RAT type;

determining a call type based at least in part on the first RAT type and the second RAT type; and sending, to a second component of the network, an indication of the call type and at least one of (A) the first RAT type and the second RAT type or (B) a RAT type change counter.

10. The system as claim 9 recites, wherein determining the call type further comprises determining the call type as a fallback call type based on a difference in the first RAT type and the second RAT type.

11. The system as claim 9 recites, wherein determining the call type further comprises determining the call type as a voice over new radio (VoNR) type based on the first RAT type equaling the second RAT type.

12. The system as claim 9 recites, wherein the RAR is a first RAR and the operations further include:

receiving a second RAR from the PCF, the second RAR indicating a third RAT type; and wherein determining the call type based at least in part on the third RAT type.

13. The system as claim 12 recites, wherein the operations further include:

in response to determining the third RAT type differs from the second RAT type, incrementing the RAT type change counter; and sending the RAT type change counter with the indication of the call type to the second component of the network.

14. The system as claim 13 recites, wherein the operations further include:

sending the first RAT type, the second RAT type, and the third RAT type with the indication of the call type to the second component of the network.

15. The system as claim 9 recites, wherein the second component of the network is at least one of:

an IP multimedia subsystem (IMS) core; or the PCF.

16. The system as claim 9 recites, wherein sending the indication of the call type to the second component of the network is responsive to the invite being answered by a receiving UE.

17. A non-transitory computer storage medium having programming instructions stored thereon that, when executed by one or more processors, implement a proxy-call session control function (P-CSCF) of a network to perform operations comprising:

receiving an invite from an originating user equipment (UE);

receiving an authorization and Accounting (AAA) from a policy control function (PCF), the AAA indicating a first radio access technology (RAT) type;

storing the first RAT type;

receiving a re-authorization request (RAR) from the PCF, the RAR indicating a second RAT type;

storing the second RAT type;

determining a call type based at least in part on the first RAT type and the second RAT type; and sending, to a second component of the network, an indication of the call type and at least one of (A) the first RAT type and the second RAT type or (B) a RAT type change counter.

18. The non-transitory computer storage medium as claim 17 recites, wherein determining the call type further comprises determining the call type as:

a fallback call type based on a difference in the first RAT type and the second RAT type, or a voice over new radio (VoNR) type based on the first RAT type equaling the second RAT type.

19. The non-transitory computer storage medium as claim 17, wherein the RAR is a first RAR and the operations further comprise:

receiving a second RAR from the PCF, the second RAR indicating a third RAT type; and wherein determining the call type based at least in part on the third RAT type.

20. The non-transitory computer storage medium as claim 19, wherein the operations further comprise:

in response to determining the third RAT type differs from the second RAT type, incrementing the RAT type change counter; and sending the RAT type change counter with the indication of the call type to the second component of the network.

* * * * *